United States Patent [19]
Roveti

[11] 3,922,600
[45] Nov. 25, 1975

[54] ELECTRICAL RECEPTACLE TESTER FOR TESTING THE MECHANICAL AND ELECTRICAL CHARACTERISTICS OF ELECTRICAL SERVICE RECEPTACLES

[76] Inventor: Denes Roveti, 15 Lincoln Park Center, Annapolis, Md. 20401

[22] Filed: Jan. 2, 1974

[21] Appl. No.: 429,722

[52] U.S. Cl. .............. 324/51; 73/9; 339/14 P; 339/45 R
[51] Int. Cl.² ............. G01R 31/02; G01 N 19/02; H01R 13/62
[58] Field of Search ............. 324/51, 66; 73/9, 81; 339/14 P, 45 R, 45 M, 46

[56] References Cited
UNITED STATES PATENTS

| | | | |
|---|---|---|---|
| 2,259,799 | 10/1941 | Corrigan | 339/45 R |
| 2,456,548 | 12/1948 | Weiner et al. | 339/45 R |
| 2,571,046 | 10/1951 | Maisey | 339/45 R |
| 2,688,734 | 9/1954 | Welling | 339/45 R |
| 3,317,825 | 5/1967 | Huff | 324/66 X |
| 3,383,588 | 5/1968 | Stoll et al. | 324/66 X |
| 3,420,090 | 1/1969 | Crenshaw et al. | 73/9 |
| 3,737,835 | 6/1973 | Clement et al. | 339/45 R |
| 3,786,392 | 1/1974 | McDaniel | 339/14 P |
| 3,808,874 | 5/1974 | Treuithick | 73/9 |

Primary Examiner—Gerard R. Strecker
Attorney, Agent, or Firm—William Grobman

[57] ABSTRACT

This specification discloses a device for performing a plurality of tests upon electrical power receptacles. The device comprises a housing which has protruding from it at one end a pair of blades of the size and spacing to duplicate the power carrying blades of an electrical power plug. A spring loaded projection from the housing bears against the receptacle when the blades are inserted therein and is driven into the housing against the action of a spring to test the grip of the receptacle contacts. A separate ground terminal is also spring loaded to test the grip of the receptacle ground contact. A knob is connected to the housing through spring members which exert a finite and preselected torque on the housing whenever the knob is rotated. This subjects the receptacle spring contacts to a twisting action to test their resistance to mechanical distortion. Signal lights indicate the proper or improper wiring of the receptacle contacts and the effectiveness of the grounding contact.

5 Claims, 5 Drawing Figures

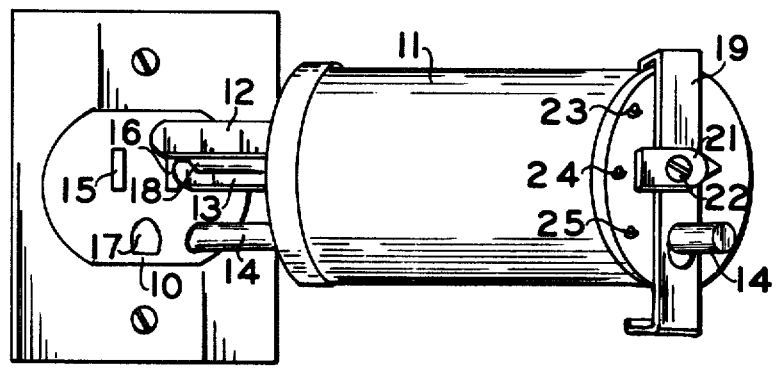
FIG. 1
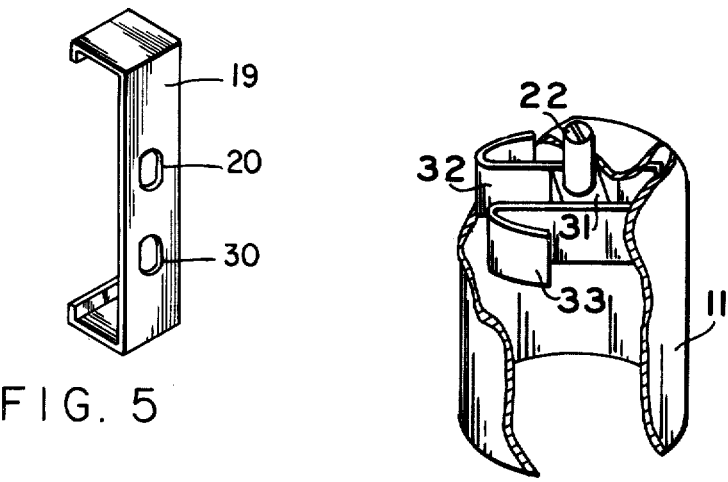
FIG. 5
FIG. 2

ELECTRICAL RECEPTACLE TESTER FOR TESTING THE MECHANICAL AND ELECTRICAL CHARACTERISTICS OF ELECTRICAL SERVICE RECEPTACLES

BACKGROUND OF THE INVENTION

1. Field of the Invention

This invention relates to test devices, and more particularly to devices for checking the effectiveness of electrical power receptacles.

Virtually every building in the United States is equipped with electrical receptacles, or outlets, in every room. To accommodate the recent proliferation of electrical appliances and equipment for both home and industry, modern buildings have a corresponding proliferation of electrical receptacles. A standard modern receptacle comprises a body of electrically nonconductive material containing two pairs of slightly curved or bowed spring contacts, each of which pairs is adapted to receive and grip a blade of a plug, and a third pair of spring contacts to receive and grip a cylindrical grounding terminal. With constant use, particularly with repeated insertions and withdrawals of plugs, the spring contacts in the receptacles tend to lose their grip. As the receptacle spring contacts are used, they become distorted, weakened and bent. They no longer grip the blades of the plugs with sufficient force to establish a good electrical contact. This can lead to failure of the plug-receptacle pair with possible heating of the contacts and the attendant fire hazard, arcing, and the possibility of complete failure of power supplied to essential equipment. In some locations, such as in hospitals, the failure of an electrical receptacle can be very dangerous. Even more dangerous than the failure of the blade contacts to hold properly is the failure of the grounding contact to hold. This removes a major safety device from the electrical circuits and can permit the existence of dangerous leakage currents. It is into this environment that the present test device is projected.

2. Description of the Prior Art

Receptacle testers of the past have been either complex electrical test systems for checking voltage and continuity or simple mechanical devices for measuring the forces with which the plug blades are gripped. In one prior art force testing device, an electrically insulated housing contained two members which extended through the end walls of the housing. One member was shaped as a plug blade and the other was cylindrical to fit the grounding contacts. Each member was resiliently coupled to the housing and carried indicators so that after insertion into a receptacle, the act of withdrawal indicated the force with which it was gripped. Although this tester was a boon to maintenance personnel in detecting those receptacles which had to be replaced, it was time consuming to use because only one of a pair of contacts could be checked at one time, and the wiring of the receptacle could not be checked. In addition, it is recognized that some electrical receptacles manufactured with poor quality materials may be more readily distorted and rendered useless than is to be expected, but the prior art devices did not test for this important failure characteristic.

SUMMARY OF THE INVENTION

It is an object of this invention to provide a new and improved testing device.

It is another object of this invention to provide a new and improved device for testing electrical terminals.

It is a further object of this invention to provide a new and improved system for testing electrical power receptacles.

It is still another object of this invention to provide a new and improved system for mechanically testing electrical receptacles and for electrically testing the receptacles for correct wiring.

These objects are achieved by a single device having an electrically nonconductive housing which carries a pair of blades adapted to fit into the power slots of electric receptacles, a spring loaded mechanical ejector to test the grip of the blade contacts within the receptacle, a ground terminal, electrical circuitry connecting the power blades and the ground terminal together and to signal lights to indicate the proper and improper wiring arrangements of the receptacles, and means for mechanically subjecting the receptacle contacts to torque to test their resistance to mechanical deformation.

Other objects and advantages of this invention will become more apparent as the following description proceeds, which description is to be considered with the accompanying drawings.

BRIEF DESCRIPTION OF THE DRAWINGS

FIG. 1 is a perspective view of the test device of this invention shown adjacent an electrical receptacle.

FIG. 2 is a partial perspective view in section of the device of FIG. 1 showing the torque producing means.

FIG. 5 is a perspective view of the slide shown in FIG. 1.

A PREFERRED EMBODIMENT

Figure 3:
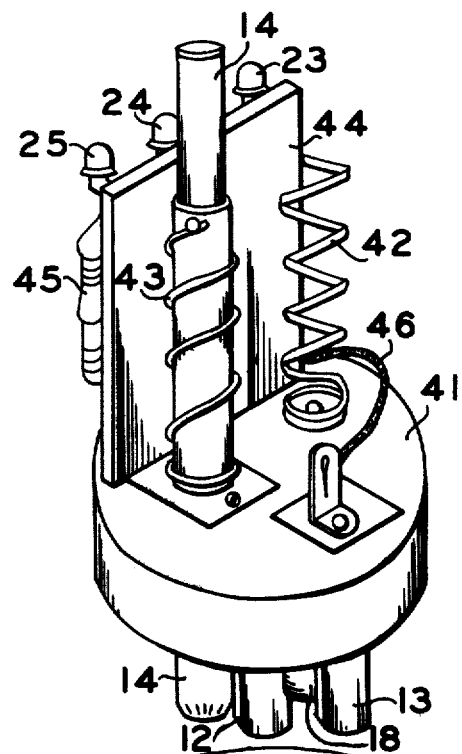
FIG. 3 is a view of a portion of the interior of the device of FIG. 1 showing the spring loading of both the ground terminal and the ejector tester.

Referring now to the drawings in detail the reference character 11 designates a generally cylindrical housing having blades 12 and 13 projecting from one end thereof. Also projecting from the one end of the housing 11 is a cylindrical ground terminal 14. As shown in FIG. 1, the blade 12 is adjacent a slot 15, the blade 13 is adjacent a slot 16, and the ground terminal is in engaging relation with an opening 17, all in the receptacle 10. An ejector 18 is positioned between the blades 12 and 13 projecting from the one end of the housing 11. The ground terminal 14 is shown also projecting from the other end of the housing 11 and through an opening in a slide 19. Also on the other end of the housing 11 is a knob 21 mounted on a shaft 22 which enters the housing 11. Signal lights 23, 24 and 25 are shown on one side of the slide 19 mounted on the other end of the housing 11.

The housing 11 is held so that the blades 12 and 13 are inserted into the slots 15 and 16 of the receptacle 10. As the blades 12 and 13 are pushed into the slots 15 and 16, the ejector 18 bears against the receptacle 10 and is forced into the housing 11 against the action of a spring contained therein. Referring to FIG. 3 a compression spring 42 is shown within the housing 11 with one of its ends attached to the end of the ejector 18. When the housing 11 is closed, the other end of the spring 42 bears against the inside of the other end of the housing 11 so that it is compressed as the ejector 18 is forced into the housing. In addition, FIG. 3 shows the ground terminal 14 extending through the interior of the housing 11 with a second compression spring 43 attached to its upper end (as shown) and bearing against the one end of the housing 11. As the ground terminal 14 is forced into the opening 17 in the receptacle 10 the spring 43 is compressed and tends to force the terminal 14 out of the opening 17. Once the tester has been placed in position with the blades 12 and 13 firmly in the slots 15 and 16 and with the ejector 18 forced into the housing 11 against the action of the spring 42, the housing 11 is then released. If the force of the spring 42 is sufficient to force the blades 12 and 13 from the slots 15 and 16 and drive the housing 11 away from the receptacle 10, then the spring contacts within the receptacle 10 are too weak to establish a good electrical connection with a power plug. If, however, the blades 12 and 13 and the housing 11 all remain where they are placed, then the grip of the spring contacts is sufficient. At this time the ground terminal 14 is forced into the opening 17 and locked into position by sliding the slide 19 over it. As shown in FIG. 5 the slide 19 includes two generally oval shaped slots 20 and 30. The slot 20 accomodates the shaft 22, and the slot 30 accomodates the ground terminal 14. The slide 19 is mounted on the shaft 22 and is slidably held on the housing 11 by the knob 22, or any other suitable means. The two slots 20 and 30 are sufficiently large to permit the slide 19 a limited longitudinal movement. With the slide 19 in the position shown in FIG. 1, the ground terminal 14 is free to move in the slot 30. However, when the terminal 14 is depressed by any convenient means such as a finger, the slide 19 may be moved a short distance so that it partially covers the end of the terminal 14 to keep that terminal depressed. Movement of the slide 19 a small amount in the other direction again positions it so that the terminal 14 is free to move within the slot 30. The slide 19 is then moved so that the opening in the slide lies over the end of the ground terminal 14. If the spring 43 forces the terminal 14 out of the opening 17, then the ground contacts in the receptacle are too weak. If the ground terminal 14 remains where it is, firmly gripped by the ground contacts, then the signal lights 23, 24 and 25 are observed. These will be discussed below. However, in FIG. 3, the signal lights 23, 24 and 25 are shown mounted on a circuit board 44 which also carries other circuit components 43. A wire 46 connects the circuit board 44 with the blade 13. The circuit board 44 is also connected to the blade 12 and to the terminal 14, but those connections are not shown in FIG. 3.

The slide 19 is moved so that the terminal 14 is retained in its fully inserted position, and then the knob 21 is rotated through 90°. Referring to FIG. 2, the shaft 22 is shown having a cube 31 mounted on it to rotate with it. The cube 31 is gripped between leaf spring members 32 and 33. The springs 32 and 33 are curved outwardly at their ends to engage the inside wall of the housing 11. As the knob 21 is rotated, the shaft 21 and the cube 31 are also rotated. This forces the spring members 32 and 33 apart so that the corners of the cube 31 can slip by. The force resisting the spreading of the spring members 32 and 33 is transmitted to the housing 11 as a torque. This places a similar torque on the blades 12 and 13 and the terminal 14 to mechanically deform the contacts within the receptacle 10. Should the ejector 18 then force the housing 11 away from the receptacle 10 and cause the blades 12 and 13 to be withdrawn, the receptacle 10 is shown to be weak and subject to serious mechanical deformation in use. This can readily cause failure of the receptacle in normal use. Should the housing 11 remain where it is placed with the blades 12 and 13 firmly gripped by the receptacle contacts, then the receptacle is safe for continued use.

Figure 4:
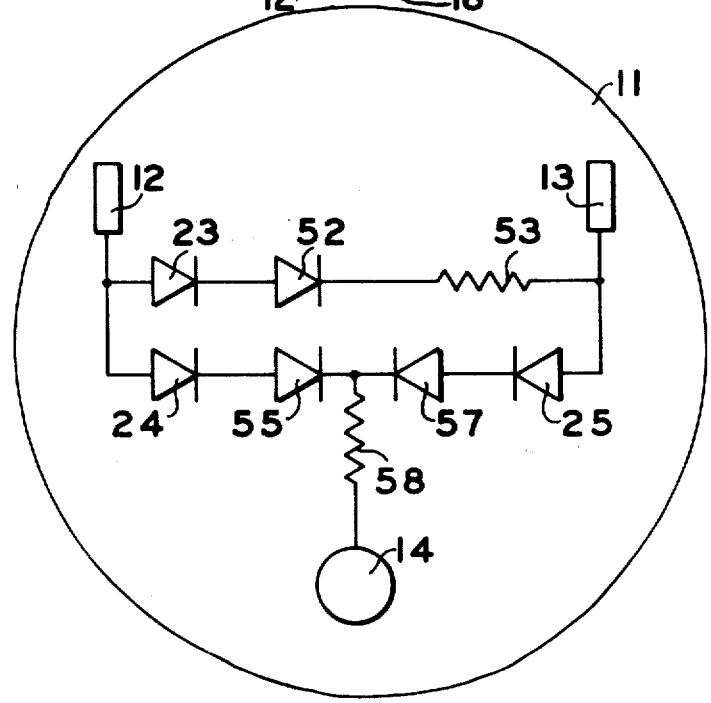
FIG. 4 is a schematic wiring diagram of the test device of FIG. 1 showing the signal lights and their connections to the blades and ground terminal.

With the mechanical testing of the receptacle completed, the electrical connections can be quickly determined merely by glancing at the three signal lights 23, 24 and 25. FIG. 4 shows the manner in which the signal lights 23-25 are connected to the blades 12 and 13 and to the ground terminal 14 to test for correct wiring. The signal lights 23-25 which are used for convenience are light emitting diodes, and one end of the light 24 is connected to the blade 12 and the other end to one end of a rectifier 52 which has its other end connected to one end of a resistor 53. The other end of the resistor 53 is connected to the blade 13. The blade 13 also is connected to one side of signal light 25 whose other side is connected to one side of a rectifier 57. The other side of the rectifier 57 is connected to both one side of a resistor 58, whose other side is connected to the ground terminal 14, and to one side of a rectifier 55. The other side of the rectifier 55 is connected to one side of the signal light 23, the other side of which is connected to the blade 12. In other words, a path is established between the blades 12 and 13 by a series arrangement of signal light 24, rectifier 52 and resistor 53. A path is established between blade 12 and terminal 14 by the series arrangement of signal light 23, rectifier 55 and resistor 58. A path is established between blade 13 and terminal 14 by the series arrangement of light 25, rectifier 57 and resistor 58. The resistors 53 and 58 are merely to limit the current flowing through the circuits, and the rectifiers 52, 55 and 57 permit the flow of current only in the forward direction through the signal lights 23-25.

In the United States most electrical systems are either three phase 120-208 volts, or single phase 120-240 volts, both alternating current. In the case of three phase wiring, there are three hot lines, with 208 volts between any two of them. Single phase circuits are taken from one hot line to neutral, and this is 120 volts. In a single phase system, two hot lines having 240 volts across them are usually supplied to a building with a neutral. Between each of the hot lines and neutral is 120 volts. In many cases, neutral is also connected to ground, but the ground connection is made primarily to provide a separate line which can carry leakage currents to the ground. Ground lines are often connected to water pipes or other metal structures which are buried underground. When the receptacle is correctly wired, lights 23 and 25 will light. Current flows from the hot blade 13 to the neutral blade 12 and to the ground terminal 14. If the ground terminal 14 is open circuited, if the ground contacts in the receptacle are not, if fact grounded, then the light 23 alone will light. When lights 24 and 25 are lit, it indicates that the hot contacts and the neutral contacts have been reverse wired, and when light 23 and 24 are lit, it shows that the ground and the neutral lines have been interchanged. Thus, by the insertion of the blades 12 and 13 and the ground terminal 14 into the openings in a receptacle, both the mechanical and the electrical characteristics of the receptacle are checked by the tester of this invention. The lights 23-25 may well be light emitting diodes. When such diodes are used, the rectifiers 52, 55 and 57 are required to prevent reverse current from flowing through the diodes 23–25.

The above specification has described a new and improved device for testing the electrical and mechanical characteristics of electrical receptacles. This tester is a simple device which can perform a number of individual checks of a single receptacle in a short time. It is realized that the above description may indicate to those skilled in the art to which it pertains, other ways in which the principles of this invention can be used without departing from its spirit. It is, therefore, intended that this invention be limited only by the scope of the appended claims.

What is claimed is:

1. Apparatus for testing electrical receptacles, said apparatus comprising a housing, at least one projection from said housing adapted to be received by receptacle power contacts, means supported by said housing for tending to remove said projection from said receptacle to indicate the grip of the contacs, means supported by said housing for applying a prescribed torque to said receptacle contacts through said projection to test the resistance of siad receptacle to mechanical deformation, said means for applying a prescribed torque comprising a shaft rotatably supported by said housing, and a resilient means coupling said shaft to said housing to resist rotation of said shaft until said prescribed torque is exerted.

2. A device for testing the mechanical and electrical characteristics of electrical service receptacles, said device comprising a housing formed of an electrically nonconductive material, at least one electrically conductive blade projecting from said housing and adapted to be received by said receptacle as a power plug blade and to be gripped by electrical contacts within said receptacle, a rod resiliently supported by said housing adjacent said blade and arranged to bear against a receptacle when said blade is fully inserted therein, means responsive to the full insertion of said blade in said receptacle for automatically exerting a continuous predetermined force against said housing tending to force said blade from said receptacle against the grip of the contacts therein, means when operated for automatically applying a preselected fixed torque through said housing to said blade tending to twist said blade in the receptacle contacts, said device further including a member adapted to be inserted into the ground opening of said electrical receptacle, and means carried by said housing tending automatically to withdraw said member from said receptacle.

3. A device for testing the mechanical and electrical characteristics of electrical service receptacles, said device comprising a housing formed of an electrically nonconductive material, at least one electrically conductive blade projecting from said housing and adapted to be received by said receptacle as a power plug blade and to be gripped by electrical contacts within said receptacle, a rod resiliently supported by said housing adjacent said blade and arranged to bear against a receptacle when said blade is fully inserted therein, means responsive to the full insertion of said blade in said receptacle for automatically exerting a continuous predetermined force against said housing tending to force said blade from said receptacle against the grip of the contacts therein, means when operated for automatically applying a preselected fixed torque through said housing to said blade tending to twist said blade in the receptacle contacts, another blade from said housing adapted to be received by said receptacle power contacts, said one and another blades being spaced on said housing so that said blades engage both of the power contacts of said receptacle at the same time, said device further including a member adapted to engage the ground contact of said receptacle, and means carried by said housing tending to withdraw said member from said receptacle.

4. The device defined in claim 3 further including means for checking the electrical wiring of said receptacle, said wiring checking means including at least a first test lamp, and means connecting said first test lamp between said one blade and said member.

5. The device defined in claim 3 further including a second test lamp, and means for connecting said second test lamp between said one and another blades.

* * * * *